United States Patent [19]

Nakagawa et al.

[11] 3,973,978

[45] Aug. 10, 1976

[54] METHOD FOR EXECUTION OF QUICK HARDENING CEMENT

[75] Inventors: Koji Nakagawa; Kenkiti Hirano, both of Niigata, Japan

[73] Assignee: Denki Kagaku Kogyo Kabushiki Kaisha, Tokyo, Japan

[22] Filed: June 17, 1974

[21] Appl. No.: 480,067

[30] Foreign Application Priority Data
June 15, 1973 Japan.................................. 48-67448

[52] U.S. Cl..................................... 106/95; 106/97; 106/104
[51] Int. Cl.$^2$...................... C04B 7/02; C04B 7/355
[58] Field of Search.......................... 106/95, 97, 104

[56] References Cited
UNITED STATES PATENTS

| | | | |
|---|---|---|---|
| 2,934,445 | 4/1960 | Jones et al. | 106/95 |
| 3,558,526 | 1/1971 | Hall et al. | 106/97 |
| 3,775,143 | 11/1973 | Mikhailov et al. | 106/97 |

*Primary Examiner*—J. Poer
*Attorney, Agent, or Firm*—Sughrue, Rothwell, Mion, Zinn & Macpeak

[57] ABSTRACT

A method for working quick hardening cements comprising preparing (A) a composition comprising a cement paste, mortar or concrete and (B) a composition comprising a powder or suspension composition of calcium aluminate and inorganic sulfate, mixing the composition (A) and the composition (B) and quickly executing the mixture immediately after the admixture.

10 Claims, No Drawings

METHOD FOR EXECUTION OF QUICK HARDENING CEMENT

BACKGROUND OF THE INVENTION

1. Field of the Invention

This invention relates to a method for on-site execution of a quick hardening cement composition, and more particularly relates to a quick hardening agent for cement which is to be admixed with a separately prepared cement paste, mortar or concrete immediately before the actual on site execution therewith.

2. Description of the Prior Art

Quick hardening cements such as a cement containing a mixture of alumina cement and gypsum and Jet Cement (trade name of Onoda Cement Co., and Sumitomo Cement Co.) are known.

Although these quick hardening cements have the advantage of developing strength within a short period of time, they are defective in that they tend to set and harden during the transport thereof since the setting time thereof is short.

In order to overcome such a defect, therefore, a setting retarder such as an organic acid is generally added and the composition is cast. However, the composition is still defective in that not only a great amount of retarder is necessary but also the setting time is determined before casting, resulting in a limitation of the execution of the cement in accordance with the determined setting time, and further, the setting time cannot freely be controlled while casting.

In addition, since the setting time changes depending upon the kind and brand of cement and upon other factors such as temperature, moisture, amount mixed, mixing time, etc., generally cements do not set and harden in a previously determined period of time, and therefore it is extremely difficult to appropriately control the setting time.

SUMMARY OF THE INVENTION

An object of this invention is to provide a method for executing quick hardening cements free from the defects in the prior art, and, more particularly, to provide a method for on-site execution of quick hardening cements. The method comprises admixing a quick hardening agent for cement comprising a powder or suspension composition of a calcium aluminate and inorganic sulfate, which optionally contains a setting retarder and/or a quick hardening accelerator, with a cement paste, mortar or concrete upon the actual field execution of the cement composition and executing immediately after the admixing.

DETAILED DESCRIPTION OF THE INVENTION

The quick hardening agent for cement of this invention indispensably contains calcium aluminate and inorganic sulfate, and optionally contains a setting retarder and/or a quick hardening accelerator. The amount of the optional component is so determined that the quick hardening agent itself does not set within 30 minutes, preferably within one hour or more, and that the agent begins to set and harden in several minutes, preferably 5 to 50 minutes or so, after being admixed with the cement paste, mortar or concrete.

The amount of quick hardening agent used ranges from about 10 to 50%, preferably 20 to 30%, on the basis of the cement. If the amount is less than about 10%, the agent used does not develop a quick setting effect, and further, the quick hardening effect obtained is not sufficient. On the contrary, the use of an amount of the agent of greater than 50% is not economical.

The proportion of inorganic sulfate to the calcium aluminate is about 0.1 to 5 parts, preferably 0.5 to 1.5 parts per part of calcium aluminate. If the amount of inorganic sulfate is less than 0.1 part, the quick setting ability of the agent is too strong, resulting in a decrease in the strength of the cement. On the contrary, if the amount of the inorganic sulfate is greater than 5 parts, the quick setting ability is too weak, and this also results in a decrease in the strength of the cement due to the expansion of the cement for a long period of time.

Preferred calcium aluminates which can be used in the present invention are crystalline and/or amorphous calcium aluminates and calcium haloaluminate solid solutions of calcium aluminate and halogen. Examples of calcium aluminates are $12CaO.7Al_2O_3$, $CaO.Al_2O_3$, $CaO.2Al_2O_3$, $3CaO.Al_2O_3$, $11CaO.7Al_2O_3$, $3CaO.3Al_2O_3$, $3CaO.3Al_2O_3.CaF_2$, etc. Especially preferred materials are amorphous $12CaO.7Al_2O_3$ and a solid solution thereof with a halogen.

Examples of inorganic sulfates which can be used are anhydrous gypsum, calcined gypsum, gypsum dihydrate, sodium sulfate and potassium sulfate and anhydrous gypsum is preferred.

Representative setting retarders which can be used in this invention are organic carboxylic acids such as gluconic acid, tartaric acid, salicylic acid, citric acid, and malic acid and the sodium, potassium and calcium salts thereof as well as a mixture of the organic acid with a carbonate such as $Na_2CO_3$, $K_2CO_3$, $MgCO_3$ or $CaCO_3$ or with a hydroxide such as KOH or $Ca(OH)_2$. Generally a suitable amount ranges from about 0.01 to 5% by weight based on the cement weight. Alkaline earth metal compounds such as $CaCO_3$, $MgCO_3$, $Ca(OH)_2$, $Mg(OH)_2$ and the like and an alkali metal compound such as $Na_2CO_3$, $K_2CO_3$, KOH, NaOH and the like can be used as a quick hardening accelerator and the cement paste or the like can contain a quick setting and hardening agent such as an alkali metal compound or an alkaline earth metal compound as described above, as long as the amount of the agent is within the range that the cement paste or the like does not set within 30 minutes or more, preferably 1 hour or more. Generally a suitable amount ranges from about 0.01 to about 10% by weight based on the cement weight.

The cement can be any of a portland cement such as normal Portland cement, rapid-hardening Portland cement, super rapid-hardening Portland cement, moderate heat Portland cement, white Portland cement, etc., blended cement such as pozzolanic cement (a silica cement), fly ash cement, blast furnace cement, etc. The cement paste can comprise such a cement plus water, the cement mortar or simply mortar can comprise a cement plus sand and the concrete can comprise a cement mortar plus an aggregate, each in proportions well known to one skilled in the art.

In addition, it is preferable for improving the properties of cement paste and the like to add cement additives such as water reducing agent (e.g., lignin calcium sulfonate, a lignin resin alkali metal salt, polyoxyethylene nonyl phenol, usually used in an amount of about 0.05 to 5% by weight based on the cement), AE agent (e.g., an air entraining agent such as a polyoxyethylene alkylphenol ether, an alkylbenzene sodium sulfonate, an alkyl allyl sodium sulfonate, etc., usually used in an amount of about 0.05 to 5% by weight based on the cement), blowing agent (e.g., Al powder, Zn powder, CaSi and the like, usually used in an amount of about 0.01 to 1% by weight based on the cement), expanding agent, etc., to either or both of the cement quick hardening agent and cement paste or the like.

Any means can be applied for admixture of the cement quick hardening agent and cement paste or the like as long as casting is completed prior to setting and hardening of the cement mixture since the mixture is so prepared that setting and hardening occur in several minutes after admixture. One embodiment of admixing is the use of a Y-tube.

The above description is relative to a method where two compositions of the cement quick hardening agent and the cement paste or the like are separately prepared and these two are admixed upon execution thereof.

In addition to this method, another means can be applied in which one or more components of the two compositions are separately prepared and a plurality of components are admixed also upon the execution thereof.

The time range for setting without the quick hardening agent of this invention varies depending upon the type of the cement used but generally ranges from about 3 to 6 hours. Use of the quick hardening agent of the invention shortens the setting time to within several seconds or, at the longest, 10 minutes.

As explained in detail in the above description, the method of this invention is execution of quick hardening cements, wherein the two compositions of the cement quick hardening agent and the cement paste or the like are so prepared that separately they remain stable for a long period of time and that upon mixture setting and hardening begins within several minutes after the admixture thereof. These two compositions are admixed upon the execution thereof and are subjected to field working immediately after the admixture.

The method of this invention has various advantages, some of which are set forth below.

i. This method is very easy to conduct and the setting characteristic of the cement composition is good, particularly, the temperature characteristic thereof is excellent.

ii. Even cement compositions which set in several minutes and which cannot be cast using conventional techniques can be executed according to the present method, and further, the amount of retarder which might be needed is small.

iii. Various characteristics of strength, elasticity, setting time and fluidity can freely be controlled by appropriately changing the proportion of the cement quick hardening agent and the cement paste or the like blended.

iv. Large-scale site execution is possible within a short period of time.

The present invention displays excellent effects not only in general construction using cement paste and the like but also in concrete during freezing weather, prepacked concrete, pumpcrete, manufacture of concrete secondary products, shotcrete and grouting.

In the present specification all parts and percents are by weight unless otherwise indicated. The setting time means the time spent until the cement mixture no longer flows down in a J-funnel.

The present invention will be explained in greater detail by reference to the following Examples.

EXAMPLE 1

Ready mixed concrete compositions comprising the ingredients set forth in Table 1 below and cement quick hardening agent compositions comprising the ingredients set forth in the Table 2 below were subjected to pump casting for building a rooftop, where a Y-tube was provided in front of the concrete spout outlet with a distance of 1 m.

The cement quick hardening agent was fed under a pressure from one inlet of the Y-tube in proportion of 143 liters per 1 $m^3$ of raw concrete so that the solid content thereof was maintained at 25% on the basis of the cement. The casting conditions used are shown in Table 3 below. In Table 4 below the properties (No. 1) of the concrete to which the cement quick hardening agent was incorporated in the same proportion as above and the properties (No. 2) of the raw concrete used therefor are shown.

TABLE 1

| Slump | Dropping in Slump Test | Air | Proportion of Fine Aggregate | Cement | Water | Sand | Gravel | AE Agent Chupol* |
|---|---|---|---|---|---|---|---|---|
| (cm) | | (%) | (%) | (kg/$m^3$) | (kg/$m^3$) | (kg/$m^3$) | (kg/$m^3$) | (g/$m^3$) |
| 20 | No appearance in 3 hrs. | 3 | 41.5 | 315 | 170 | 730 | 1048 | 300 |

*Trademark manufactured by Takemoto Oil and Fat Co.

TABLE 2

| Ingredients | | | | | Properties | |
|---|---|---|---|---|---|---|
| Amorphous 12CaO.7Al$_2$O$_3$ | Anhydrous Gypsum | Sodium Gluconate | Na$_2$CO$_3$ | Water | J-Funnel | Setting Time |
| 275 kg | 275 kg | 3 kg | 20 kg | 450 l | 10 sec | 3 hours and 50 minutes |

TABLE 3

| Amount of Concrete Spouted | Amount of Cement Quick Hardening Agent Spouted | Amount Cast | Atmospheric Temperature | Length Calculated in Horizontal Length |
|---|---|---|---|---|
| 20 m³/h | 2.9 m³/h | 80 m³ | 18°C | 105 m |

TABLE 4

| No. | Slump (cm) | Handling Time | Compressive Strength (kg/cm²) | | | | |
|---|---|---|---|---|---|---|---|
| | | | 30 min | 1 hr | 3 hr | 1 day | 28 days |
| 1 | 22 | 7 min | 20 | 83 | 190 | 257 | 410 |
| 2 | 20 | 4 hr and 30 min | 0 | 0 | 0 | 55 | 315 |

EXAMPLE 2

Mortar and cement quick hardening agent, each containing ingredients as shown in Table 5 below, were blended in the proportion as shown in Table 6 below. The respective properties obtained are shown in Tables 5 and 6.

TABLE 5

| | Ingredients (g) | | Setting Time | J-Funnel (sec) |
|---|---|---|---|---|
| Mortar | Normal | 1000 | | |
| | Portland Cement | | 3 hours and 50 minutes | 32 |
| | Sand | 1000 | | |
| | Water | 500 | | |
| Cement Quick Hardening Agent | Anhydrous Gypsum | 500 | | |
| | Amorphous 2CaO.7Al₂O₃ | 500 | 3 hours and 30 minutes | 8 |
| | Na₂CO₃ | 20 | | |
| | Sodium Gluconate | 5 | | |
| | Water | 500 | | |

TABLE 6

| Ingredients | | Setting Time (min) | J-Funnel (sec) | Compressive Strength (kg/cm²) | | |
|---|---|---|---|---|---|---|
| Mortar (kg) | Cement Quick Hardening Agent (g) | | | 1 hr | 3 hr | 24 hr |
| 1 | 130 | 1.5 | 15 | 105 | 110 | 305 |
| " | 160 | 2 | 12 | 131 | 163 | 369 |
| " | 200 | 3 | 10 | 157 | 202 | 385 |

EXAMPLE 3

In the proportion of mortar/cement quick hardening agent equal to 1kg/200g in Table 6 of Example 2, crushed stones (10–20 mm size) were packed in a molding frame (15φ × 30 cm) and prepacked concrete was prepared. The results obtained are shown in Table 7 below.

TABLE 7

| Curing Temperature (°C) | Presence of Cement Quick Hardening Agent | Setting Time (min) | J-Funnel (sec) | Compressive Strength (kg/cm²) | | | |
|---|---|---|---|---|---|---|---|
| | | | | 1 hr | 3 hr | 24 hr | 28 days |
| 5°C | Yes | 3 | 9 | 107 | 239 | 421 | 503 |
| | No | 4 hr and 50 min | 45 | 0 | 0 | 5 | 304 |
| 20°C | Yes | 3 | 10 | 170 | 255 | 407 | 487 |
| | No | 3 hr and 50 min | 32 | 0 | 0 | 68 | 395 |

The properties of cements without the cement quick hardening agent are shown for comparison.

Using the method concrete secondary products such as box culvert and Hume pipe were manufactured. The cements used have excellent strength appearance and injection ability even at a low temperature, and thus secondary products of high strength, less shrinkage and high bending strength can be manufactured. Accordingly, large-scale products which are difficult to transport can be fabricated on the site. Analogously, large-scale construction members can also be cast-in-site.

EXAMPLE 4

One part of mortar (Table 5) in Example 2 was separately admixed with one part of each of sludge exhausted from a ready mixed concrete plant and muddy water containing 20% solid contents (after drying at 110°C) to prepare two samples, and then, 0.2 part of the cement quick hardening agent in Table 5 was further admixed with each of the respective mixtures. The properties obtained are shown in Table 8 below.

TABLE 8

| Sample | Properties after Admixture | | | | | |
|---|---|---|---|---|---|---|
| | J-Funnel (sec) | Setting Time (min) | Compressive Strength (kg/cm²) | | | |
| | | | 1 hr | 3 hr | 1 day | 28 days |
| Sludge from Ready Mixed Concrete Plant | 6 | 3 | 45 | 67 | 92 | 135 |

TABLE 8-continued

| Sample | J-Funnel (sec) | Setting Time (min) | Properties after Admixture Compressive Strength (kg/cm²) | | | |
|---|---|---|---|---|---|---|
| | | | 1 hr | 3 hr | 1 day | 28 days |
| Muddy Water | 6 | 3 | 23 | 40 | 72 | 105 |

Sludge even containing a large amount of water can be dealt with to obtain a hardened substance of high strength in a short period of time, and thus, it is possible to recover the sludge for use as concrete aggregate.

EXAMPLE 5

An A composition and a B composition each comprising the ingredients as shown in Table 9 below were prepared and these were executed using a CCPI method under the conditions shown in Table 10 below.

TABLE 9

| A Composition | | B Composition | |
|---|---|---|---|
| Ingredient | Amount (kg) | Ingredient | Amount (kg) |
| Normal Portland Cement | 100 | Anhydrous Gypsum | 125 |
| Water | 100 | Amorphous $12CaO.7Al_2O_3$ | 125 |
| | | $K_2CO_3$ | 0.75 |
| | | Citric Acid | 0.75 |
| | | Water | 250 |

TABLE 10

| Proportion of A/B (by weight) | 3/1 |
|---|---|
| Injection Pressure | 200 kg/cm² |
| Spouted Amount | 25 l/min |
| Setting Time | 1 min |
| Execution Rate | 12 – 15 sec/5 cm |
| Depth of Guide Hole | 10 m |
| Execution Pitch | 40 cm |
| Amount Cast | 10 m |
| Amount of Total of A Composition and B Composition Used | 120 l/m |

After completion of injection, drilling was carried out for 6 hours. The injected part formed a series of uniform and continuous columns sufficient to completely satisfy the purpose of water and mud stopping.

Characteristic features of the quick hardening paste of the present invention are set forth below.

1. No harmful organic component is present, and furthur, a cement paste which sets in a short period of time can be injected.
2. The hardening speed after injection is high, and therefore, the paste sufficiently hardens even in underground water flow areas, and the water stopping effect is excellent.
3. The strength of the injected and hardened substance is high, and the substance can be a pile as such. Thus, no additional execution of piling is necessary.

EXAMPLE 6

An A composition and a B composition each of ingredients as shown in Table 11 below were prepared, and these solutions were used for injection of rock ground in a tunnel.

TABLE 11

| A Composition | | B Composition | |
|---|---|---|---|
| Ingredient | Amount (kg) | Ingredient | Amount (kg) |
| Normal Portland Cement | 100 | Anhydrous Gypsum | 125 |

TABLE 11-continued

| A Composition | | B Composition | |
|---|---|---|---|
| Ingredient | Amount (kg) | Ingredient | Amount (kg) |
| Water | 500 | Amorphous $12CaO.7Al_2O_3$ | 125 |
| | | $K_2CO_3$ | 0.75 |
| | | Citric Acid | 0.75 |
| | | Water | 1250 |

TABLE 12

| Proportion of A/B (by weight) | 3/1 |
|---|---|
| Injection Pressure | 70 kg/cm² |
| Spouted Amount | 20 l/min |
| Setting Time | 2 minutes and 30 seconds |
| Means for Admixture of A Compositon and B Composition | Y-tube |

Leakage of water was completely stopped, and the rock ground becomes firmly solidified when the above was used.

The characteristic features in the method are set forth below.

1. The raw materials used are inexpensive and harmless, different from the chemical injection method.
2. The working ability is excellent and the hardened substance has high strength. Hydrates are quickly formed and thus, penetration into fine cracks is good and the ability to stop water is particularly good.

EXAMPLE 7

Mortar comprising the ingredients as shown in Table 13 below was admixed with a Y-tube and a line-mixer, and was used for lining of steel pipe under the conditions shown in Table 14 below.

TABLE 13

| A Composition | | B Composition | |
|---|---|---|---|
| Ingredient | Amount (kg) | Ingredient | Amount (kg) |
| Normal Portland Cement | 450 | Anhydrous Gypsum | 125 |
| Sand | 1200 | Amorphous $12CaO.7Al_2O_3$ | 125 |
| Water | 225 | | |
| | | $Na_2CO_3$ | 10 |
| Cement Expanding Agent (CSA by Denki Kagaku) | 50 | | |
| | | Sodium Gluconate | 1 |
| | | Water | 125 |

TABLE 14

| Proportion of A/B (by weight) | 5/1 |
|---|---|
| Setting Time | 10 min |
| Mixing Means | Y-tube and line-mixer |
| Inner Diameter and Length of Steel Pipe | 3m × 6m thickness of mortar: 20mm |
| Rolling Time | 10 min |
| Centrifugal Force | 50G |

Sufficient strength was obtained without steam curing, and the goods could be forwarded in 2 hours after lining when the above was used.

This method has various advantages, some of which are described below.

1. Water-cut under centrifugal force is good, and no bleeding phase appears.
2. Steam curing is unnecessary, and the goods can be forwarded smoothly.
3. Expansive power can efficiently be utilized. (This is because the cement composition used has quick hardening property and there is no loss of expansive power.)
4. Poor quality goods are not produced.

When this method is applied to the centrifugal shaping of other concrete secondary products (such as Hume pipes, piles), good results can be obtained in a similar manner.

EXAMPLE 8

Using the components as shown in Table 15 below, a mold was prepared under the conditions shown in Table 16.

TABLE 15

| A Composition | | B Composition | |
|---|---|---|---|
| Ingredient | Amount (kg) | Ingredient | Amount (kg) |
| Sand | 100 | Sand | 2 |
| Normal Portland Cement | 10 | Anhydrous Gypsum | 1 |
| Water | 5 | Amorphous $12CaO.7Al_2O_3$ | 1 |

TABLE 16

| | |
|---|---|
| Proportion of A/B | 115/4 (by weight) |
| Mixer Used | mortar mixer |
| Hardening Time | 15 minutes after admixture of A and B Compositions |

A column sample (diameter: 5 cm, height: 5 cm) was manufactured from a mixture of the A Composition and the B Composition, and the compressive strength of the sample was measured after 1, 6 and 24 hours, respectively. The results obtained are shown in the following Table 17.

TABLE 17

| | 1 Hour | 6 Hours | 24 Hours |
|---|---|---|---|
| Compressive Strength | 5 kg/cm² | 23 kg/cm² | 48 kg/cm² |

This method have the following advantages:

1. The handling time can be freely selected while mixing the A Composition and B Composition. After mixing, the mixture is quickly hardened, and the operation therewith is extremely easy.
2. The quick hardening property is excellent and the hardened goods have high strength. It is therefore possible to utilize the present cement composition in the manufacture of large-scale castings and large-scale mold for steel casting.
3. The proportion of the quick hardening agent added to cement can be changed, and so this method is economical.

EXAMPLE 9

Construction of prepacked concrete in water has recently increased abruptly. In particular, in the case of construction with prepacked concrete in an ocean current or in flowing river water, the grouted cement is diluted with water while flowing in a coarse aggregate filler layer. Therefore, it is impossible to carry out uniform concrete construction. In addition, any conventional method for the construction is defective in that cement milk flows out causing environmental pollution of the ocean and public nuisance problems.

The method of this invention can overcome difficult problems, and one embodiment is shown hereinafter.

In this Example, the same ingredients as in Example 2 (Table 5) were used. Mortar (A Composition) and cement quick hardening agent (B Composition) were introduced in a two-body type mixer (MD-300 by Yamato Boring Co.) through two rubber hoses. A plunger pump (by Yamato Boring Co.) was used for introduction of the A Composition and a gear pump for the introducton of B Composition. The top end was connected with a Y-tube, and a line mixer with a nozzle (T.K. Ross L.P.D. Mixer, TYP 1 ½ B — M6, by Tokushu Kikai Co.) was provided therewith. Prepacked concrete injection (about 3 m³) was carried out on the seabed (depth: 5 m). The ratio of the A Composition to the B Composition was 1/0.2 by weight.

The spouting pressure at the top of the nozzle was 5 to 15 kg/cm², and the two compositions were sufficiently blended.

The injection was completed in about 15 minutes, and setting began after about 5 minutes. The compressive strength of the concrete after 2 hours was 280 kg/cm². Dense concrete was obtained which did not flow in sea water.

EXAMPLE 10

52 parts of quick lime (purity: 94.0%) and 48 parts of white bauxite (purity: 86.7%) were blended, the mixture was melted in a directly heated electric resistance furnace with carbon electrodes. The resulting melt was flowed out of the furnace and compressed air at a pressure of 5 kg/cm² was blown thereto, to obtain blue amorphous calcium aluminate beads.

The temperature of the melt ws 1560°C as measured with an optical pyrometer. The ingredients of the calcium aluminate obtained are shown in the following Table 18.

TABLE 18

| (Ingredients of amorphous calcium aluminate) | | | | | | |
|---|---|---|---|---|---|---|
| CaO | $Al_2O_3$ | $SiO_2$ | MgO | $Fe_2O_3$ | $TiO_2$ | Total |
| 48.9 | 41.6 | 5.5 | 2.6 | 1.0 | 0.2 | 100.1 |

The melt was put in a double-walled iron ladle and gradually cooled therein for crystallization. The main component of the crystallized product was $12CaO.7Al_2O_3$.

In this Example one embodiment for manufacture of the soluble aluminate which is used in the present invention is shown.

Conventional grouting with normal Portland cement was carried out for comparison where the method of this invention was not utilized.

Pozzolith No. 602 (trade mark manufactured by Nisso-Master Builders Co.), sodium aluminate and methyl cellulose were used as the blending agent. While grouting the mortar in a J-funnel for 10 seconds, separation of cement and sand vigorously occurred, and after grouting, flowing of the mortar in sea water was observed. After 2 hours, it was impossible to measure the strength of grouted mortar.

Another experiment was carried out on the resistance of the prepacked concrete of this invention to sea water corrosion, and it was found after the experiment that the resistance of the prepacked concrete of this invention was far more excellent than that of conventional prepacked concrete. The reasons are given below.

The above described resistance to dilution is high. The density is high. High strength is obtained in a short period of time. In addition, a lot of ettringite is formed in the initial stage of hydration, each and every nonhydrated calcium aluminate becomes dense, and corrosion due to $SO_4^{--}$ ion dissolved in sea water can be substantially ignored.

Various studies on the effect of $Cl^-$ ion have heretofore been made. According to these studies, the diffusion coefficient of $Cl^-$ ion is on the order of $10^{-8}$ cm$^2$/sec as measured with the cement paste of the present invention, and it is noted that diffusion of $Cl^-$ ion is inhibited with increase of the amount of ettringite formed.

In view of the above reasons, it is concluded that the materials and method of this invention are characteristically effective for manufacture of concrete having extremely excellent sea water resistance.

In addition, the present invention can also be applied to concrete-casting during freezing weather and treatment of sludge in a seabed.

While the invention has been described in detail and with reference to specific embodiments thereof, it will be apparent to one skilled in the art that various changes and modifications can be made therein without departing from the spirit and scope thereof.

What is claimed is:

1. A method for working quick hardening cements comprising preparing (a) a composition selected from the group consisting of a cement paste, mortar and concrete and (b) 10–50% by weight based on cement content of composition (a) of a composition selected from the group consisting of a powder composition of calcium aluminate and inorganic sulfate and a suspension composition of calcium aluminate and inorganic sulfate wherein the proportion of calcium aluminate: inorganic sulfate is 1:0.1 to 5 parts by weight, mixing the composition (a) and the composition (b) and casting the mixture immediately after the admixture.

2. The method as claimed in claim 1, wherein said composition (b) contains an organic carboxylic acid or a salt thereof and a metal carbonate.

3. The method as claimed in claim 1, wherein said calcium aluminate is an amorphous calcium aluminate or calcium haloaluminate. k 4. The method as claimed in claim 3, wherein said calcium aluminate is an amorphous $12CaO.7Al_2O_3$.

5. The method as claimed in claim 1, wherein the proportion of calcium aluminate: inorganic sulfate in said composition (b) is about 1:0.5 to 1:1.5 by weight.

6. The method as claimed in claim 1, wherein the amount of said composition (b) is about 20 to 30% by weight on the basis of the cement content of composition (a).

7. The method as claimed in claim 2, wherein said calcium aluminate is an amorphous calcium aluminate or calcium haloaluminate.

8. The method as claimed in claim 7, wherein said calcium aluminate is an amorphous $12CaO.7Al_2O_3$.

9. The method as claimed in claim 2, wherein the proportion of calcium aluminate: inorganic sulfate in said composition (b) is about 1:0.5 to 1:1.5 by weight.

10. The method as claimed in claim 2, wherein the amount of said composition (b) is about 20 to 30% by weight on the basis of the cement content of composition (a).

* * * * *